(12) United States Patent
Yan et al.

(10) Patent No.: US 12,118,767 B1
(45) Date of Patent: Oct. 15, 2024

(54) CLASSIFICATION METHOD BASED ON SKELETON LINES FOR MAP BUILDING SHAPES

(71) Applicant: LANZHOU JIAOTONG UNIVERSITY, Lanzhou (CN)

(72) Inventors: Haowen Yan, Lanzhou (CN); Xiaomin Lu, Lanzhou (CN); Jingzhong Li, Lanzhou (CN); Liming Zhang, Lanzhou (CN); Ben Ma, Lanzhou (CN); Pengbo Li, Lanzhou (CN); Wende Li, Lanzhou (CN)

(73) Assignee: LANZHOU JIAOTONG UNIVERSITY, Lanzhou (CN)

(*) Notice: Subject to any disclaimer, the term of this patent is extended or adjusted under 35 U.S.C. 154(b) by 0 days.

(21) Appl. No.: 18/733,876

(22) Filed: Jun. 5, 2024

(30) Foreign Application Priority Data

Aug. 11, 2023 (CN) .......................... 202311007270.0

(51) Int. Cl.
*G06K 9/00* (2022.01)
*G06V 10/44* (2022.01)
(Continued)

(52) U.S. Cl.
CPC .......... *G06V 10/751* (2022.01); *G06V 10/457* (2022.01); *G06V 10/761* (2022.01); *G06V 10/764* (2022.01)

(58) Field of Classification Search
CPC ........ G06V 10/82; G06V 20/10; G06V 20/64; G06V 10/764; G06V 10/70; G06V 20/52; G06V 20/182; G06V 10/141; G06V 20/58; G06V 10/44; G06V 10/751; G06V 10/10; G06V 10/16; G06V 20/56; G06V 40/28; G06V 10/25; G06V 10/34; G06V 10/457; G06V 10/762; G06V 20/176; G06V 40/11; G06V 10/774; G06V 20/13; G06V 20/40; G06V 20/54; G06V 20/582; G06V 20/95; G06V 30/333; G06V 30/36; G06V 40/113; G06V 10/22; G06V 10/454; G06V 10/469; G06V 2201/033; G06V 30/10;
(Continued)

(56) References Cited

U.S. PATENT DOCUMENTS

| | | | |
|---|---|---|---|
| 6,996,505 B1 * | 2/2006 | Edelsbrunner | G06T 17/205 703/2 |
| 2011/0311129 A1 * | 12/2011 | Milanfar | G06V 10/50 382/154 |

(Continued)

*Primary Examiner* — Alex Kok S Liew

(57) ABSTRACT

Disclosed in the present disclosure is a classification method based on skeleton lines for building shapes. The method includes: (1) expanding a template library of buildings by combining building shape classification in architecture and building shape features in real life on the basis of inheriting advantages of a traditional template matching method; (2) avoiding influence of small depressions and protrusions of the buildings on overall shapes by constructing a least-squares template; (3) extracting the skeleton lines of the buildings and calculating feature vectors of the buildings; and (4) calculating similarity between feature vectors of skeleton lines of the buildings and skeleton lines of templates by using cosine similarity, and selecting the template with the highest similarity as a classification result of the building shapes.

3 Claims, 10 Drawing Sheets

(51) Int. Cl.
*G06V 10/74* (2022.01)
*G06V 10/75* (2022.01)
*G06V 10/764* (2022.01)

(58) Field of Classification Search
CPC .. G06V 30/194; G06V 30/413; G06V 30/422; G06V 40/107
See application file for complete search history.

(56) References Cited

U.S. PATENT DOCUMENTS

| | | | | |
|---|---|---|---|---|
| 2013/0113797 | A1* | 5/2013 | Mitrakis | G06T 17/10 345/420 |
| 2015/0278589 | A1* | 10/2015 | Mazurenko | G06V 40/107 382/103 |
| 2016/0026857 | A1* | 1/2016 | Petyushko | G06V 10/469 382/103 |
| 2020/0027266 | A1* | 1/2020 | Chen | G06T 17/10 |

\* cited by examiner (a) Feature vector of Y-type building (b) Feature vector of C-type building

| Target | Template vector | | | | | | | | | |
|---|---|---|---|---|---|---|---|---|---|---|
| | ┼ | 长 | ├ | T | 人 | H | TT | 口 | L | ↑ |
| ✤ | 0.9315 | | | | | | | | | |
| ✤ | 0.9293 | | | | | | | | | |
| 言 | ---- | 0.9721 | 0.7730 | 0.3596 | 0.2589 | | | | | |
| 秦 | ---- | 0.9831 | 0.9244 | 0.7729 | 0.3442 | | | | | |
| 卡 | ---- | 0.8354 | 0.9790 | 0.9393 | 0.5605 | | | | | |
| 丰 | ---- | 0.8362 | 0.9702 | 0.9483 | 0.5770 | | | | | |
| 雪 | ---- | 0.4838 | 0.7087 | 0.9734 | 0.9980 | | | | | |
| 木 | ---- | 0.6692 | 0.8450 | 0.9949 | 0.7382 | | | | | |
| 李 | ---- | 0.5880 | 0.7421 | 0.9199 | 0.9994 | | | | | |
| 人 | ---- | 0.6246 | 0.8569 | 0.9440 | 0.9463 | | | | | |
| H | | | | | | 0.9524 | 0.7938 | | | |
| 林 | | | | | | 0.9238 | 0.7273 | | | |
| 小 | | | | | | 0.4623 | 0.8847 | | | |
| 斗 | | | | | | 0.4627 | 0.9480 | | | |
| 口 | | | | | | | | 0.9974 | 0.9486 | 0.2508 |
| ⊙ | | | | | | | | 0.8839 | 0.6573 | 0.3676 |
| 下 | | | | | | | | 0.9186 | 0.9925 | 0.9213 |
| ∠ | | | | | | | | 0.9155 | 0.9908 | 0.9245 |
| 及 | | | | | | | | 0.6398 | 0.8589 | 0.9817 |
| 必 | | | | | | | | 0.7302 | 0.9309 | 0.9963 |
| ˋ | | | | | | | | | | 1.0 |
| 心 | | | | | | | | | | 1.0 |

FIG. 9

| Type | Number of experiments | Correct data | Accuracy | Type with most mismatching |
|---|---|---|---|---|
| Cross type | 19 | 18 | 94.7% | Rectangle type |
| E type | 40 | 37 | 92.5% | F type |
| F type | 26 | 26 | 100% | ---- |
| T type | 13 | 13 | 100% | ---- |
| Y type | 10 | 10 | 100% | ---- |
| H type | 13 | 13 | 100% | ---- |
| π type | 16 | 16 | 100% | ---- |
| C type | 14 | 14 | 100% | ---- |
| L type | 15 | 15 | 100% | ---- |
| Z type | 10 | 10 | 100% | ---- |
| Rectangle type | 11 | 11 | 100% | ---- |

FIG. 10

CLASSIFICATION METHOD BASED ON SKELETON LINES FOR MAP BUILDING SHAPES

TECHNICAL FIELD

The present disclosure relates to the fields of geometry, graphics, cartography, computer-aided design and manufacturing, etc., and in particular to a classification method capable of directly recognizing building shapes.

BACKGROUND

Building shape classification calculation is a basic theoretical problem in cartography, graphics, computer aided design and manufacturing, geometry, etc., which is the basis of polygon simplification, map matching, change detection, etc., and shape recognition and classification of buildings has always been a hot issue of research in the related fields.

Buildings are mostly man-made elements, meaning that there are usually several specific patterns on a map. Therefore, template matching methods are often used for building shape classification. For example, Yan et al. employ Fourier transform to calculate similarity between buildings and templates to complete template matching. Yan Xiongfeng et al. employ a rotation corner function to describe building shapes to achieve matching between buildings and a template library. Liu Pengcheng et al. employ the shape number to describe building shapes to achieve matching between buildings and templates. However, traditional template matching methods have the following problems: (1) The matching process mainly compares building outlines with templates, which is likely to be disturbed by local features, and usually only plays a good role in recognizing buildings with more right-angled edges, but the recognition effect is not good for irregular buildings. (2) The building template is not comprehensive enough, and there is a situation that the template cannot accurately describe shapes of the buildings. (3) The recognition accuracy is limited.

SUMMARY

In view of this, an objective of the present disclosure is to provide a high-precision building shape recognition and classification method capable of avoiding local feature interference on the basis of expanding a template library.

In order to achieve the objective, the present disclosure employs the following technical solution:

A recognition method for high-precision building shapes includes two parts, namely extracting skeleton lines of buildings, and constructing a template library and performing template matching by calculating cosine similarity of feature vectors:

The steps for extracting skeleton lines are as follows:
- S1: extracting building feature points by using a Douglas-Peucker algorithm;
- S2: fitting points between feature points in a building polygon by using a least square method to obtain a line segment, and then extending each fitted line segment to form a closed polygon which is a least-squares template of the map building;
- S3: encrypting a point set constituting a boundary of the least-squares template of the building, and performing constrained Delaunay triangulation on this basis: dividing Delaunay triangles into three types: a triangle with one edge on the boundary of the building being called a triangle of a first type, a triangle with two edges on the boundary of the building being called a triangle of a second type, and a triangle without edges on the boundary of the building being called a triangle of a third type;
- S4: performing connection to form local skeleton lines: for the triangle of a first type, connecting midpoints of two edges not located on the least-squares template to form local skeleton lines; and for the triangle of a third type, connecting a center of the triangle and midpoints of three edges to generate local skeleton lines; and
- S5: connecting the local skeleton lines to form skeleton lines: a connecting principle being: by taking the midpoints of all the triangles of a third type as starting points, connecting the midpoints sequentially to the partial skeleton lines of the triangles of a first type between the midpoints of the next adjacent triangles of a third type, thereby forming complete skeleton lines.

The steps of calculating feature vectors and performing template matching by using cosine similarity are as follows:
- S6: generating feature vectors of the buildings and templates: breaking the skeleton lines at intersection points, and connecting endpoints of the skeleton lines to form the feature vectors by taking the points with the largest number of connected line segments as starting points;
- S7: performing preliminary screening on the templates: since feature vector sets corresponding to different shapes are different, firstly, employing the feature vector sets to preliminarily screen the templates in the template library, and reserving templates identical to the feature vector sets of the buildings for further calculation;
- S8: performing superposition on the feature vectors: moving all the starting points of the feature vectors to an origin (0, 0), where this operation is capable of placing the feature vectors of the map buildings on the same basis as the feature vectors of the templates in the template library; fixing the feature vectors of the templates, and rotating the feature vectors of the buildings by a revolution by taking a fixed angle as a step size;
- S9: calculating cosine similarity between the feature vectors of the buildings and the feature vectors of the templates after each rotation, and taking a maximum value of the cosine similarity obtained as cosine similarity between the feature vectors of the buildings and the feature vectors of the templates after one revolution; and
- S10: determining the highest similarity, namely the category to which the buildings belong, by calculating the cosine similarity between the buildings and the screened templates.

BRIEF DESCRIPTION OF THE DRAWINGS

In order to more clearly describe the technical solutions in the examples of the present disclosure or in the prior art, a brief introduction to the accompanying drawings required for the description of the examples or the prior art will be provided below. Obviously, the accompanying drawings in the following description are merely schematic diagrams of the present disclosure. Those of ordinary skill in the art can also derive other accompanying drawings from the provided accompanying drawings without making creative efforts.

FIG. 9 shows part of building matching results provided by the present patent.

FIG. 10 shows statistical experimental results of a method provided by the present patent.

DETAILED DESCRIPTION OF THE EMBODIMENTS

The technical solutions in the examples of the present disclosure will be clearly and completely described below with reference to the accompanying drawings in the examples of the present disclosure. Obviously, the described examples are merely some examples rather than all examples of the present disclosure. All the other examples obtained by those of ordinary skill in the art based on the examples in the present disclosure without creative efforts shall fall within the scope of protection of the present disclosure.

Figure 1:
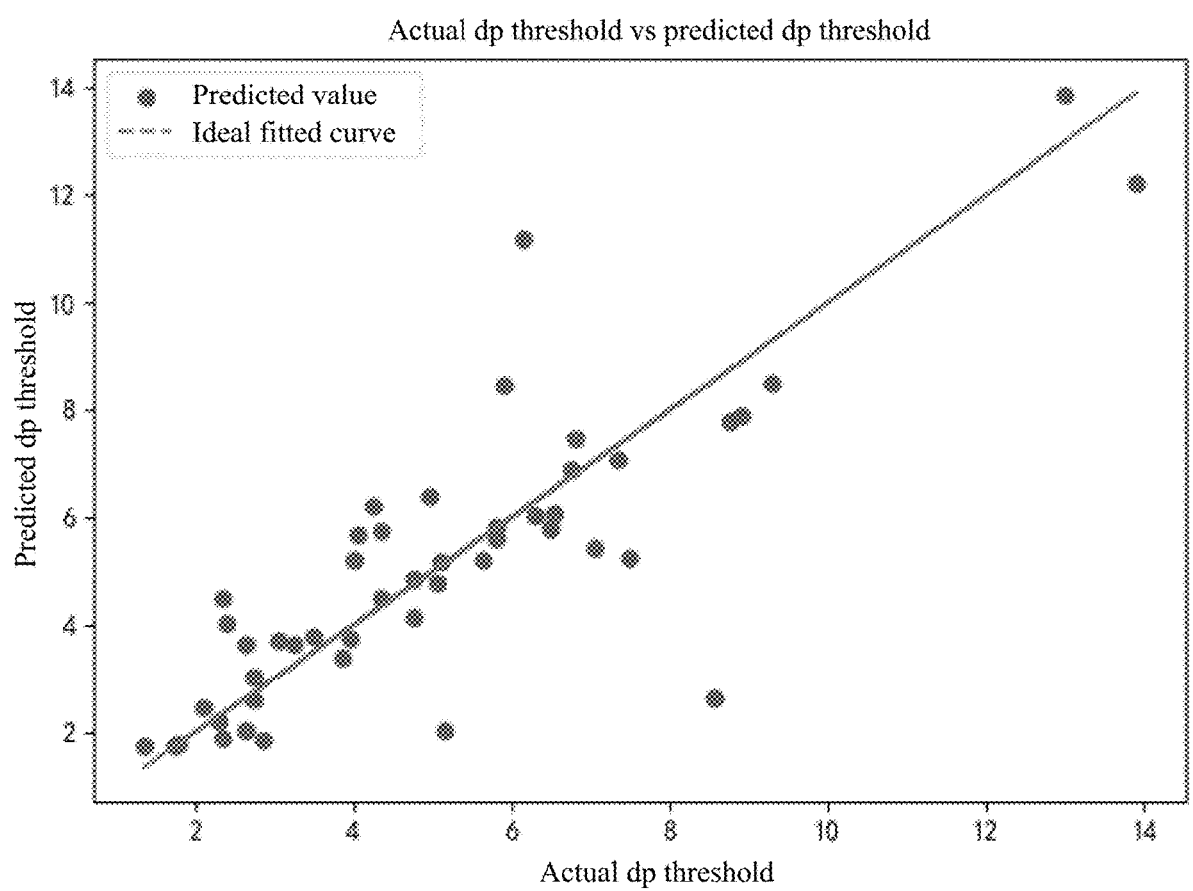
FIG. 1 is a schematic diagram of threshold calculation of a Douglas-Peucker algorithm provided by the present disclosure.

The following is the part of extraction of feature points of buildings:

Step 1: Computing a threshold of a Douglas-Peucker algorithm:

In order to explore the relationship between the threshold of the Douglas-Peucker algorithm and building edges, 194 typical buildings of various types are selected, and an average edge length, a median edge length, the maximum edge length, the minimum edge length and the number of edges are calculated respectively as five types of features. Random forest modeling is performed on sample data by using Python, with the minimum number of leaves set to 1, the number of decision trees set to 100, a training set accounting for 75% of the total data, and a test set accounting for 25%. Data of the test set is used for evaluating model accuracy. FIG. 1 shows a scatter plot of the Douglas-Puecker (DP) algorithm threshold predicted by using a random forest method and an actual threshold. Most samples in the figure are clustered around the 1:1 line, with a relatively high fitting degree, a mean squared error of 2.37, and an R-squared of 0.67. However, it should be noted that the optimal threshold for DP of one piece of building data is an interval, not a numerical value. It can accurately reflect the accuracy to determine whether the predicted value is included in the threshold interval of the DP algorithm. After calculation, 95.83% of the predicted values are included in the threshold interval of the DP algorithm, which can accurately simplify the building.

Figure 2:
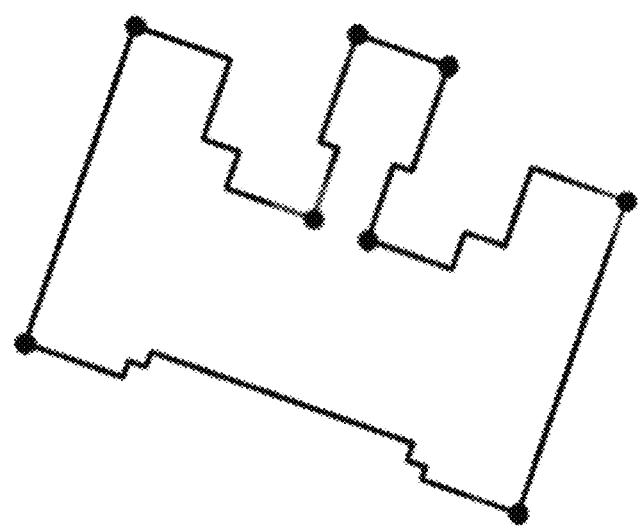
FIG. 2 is schematic diagram of feature points of a building provided by the present disclosure.

Step 2: Acquiring feature points of buildings by means of simplification using the Douglas-Peucker algorithm, as shown in FIG. 2.

The following is the part of constructing the least-squares template:

Step 1: Fitting the points between the feature points in the building polygon by the least square method to obtain a line segment.

Figure 3:
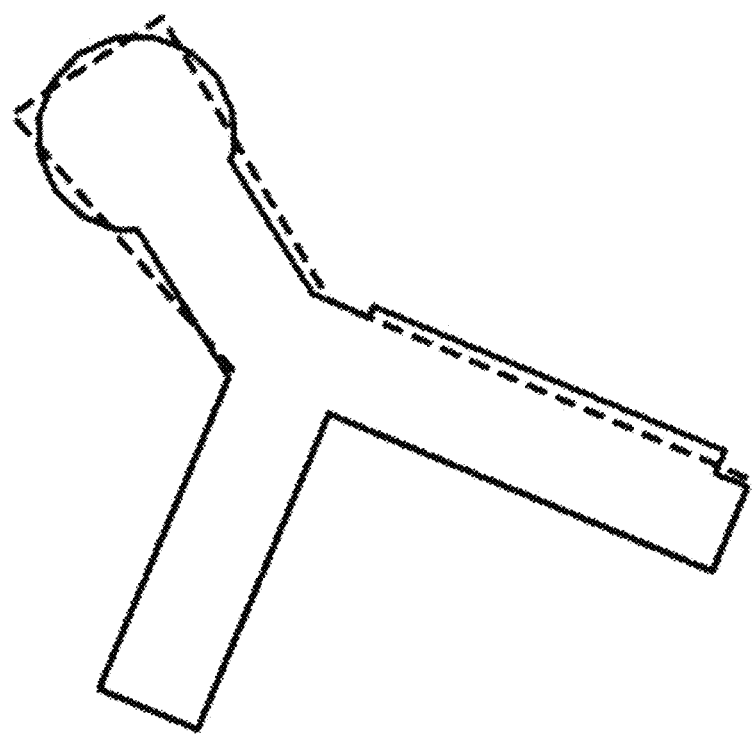
FIG. 3 is a least-squares template of a building provided by the present disclosure.

Step 2: Extending each fitted line segment to form a closed polygon which is a least-squares template of the map building, as shown in FIG. 3.

The following is the part of extracting skeleton lines of buildings:

Step 1: Encrypting a point set constituting a boundary of the least-squares template of the building, and performing constrained Delaunay triangulation on this basis.

Figure 4:
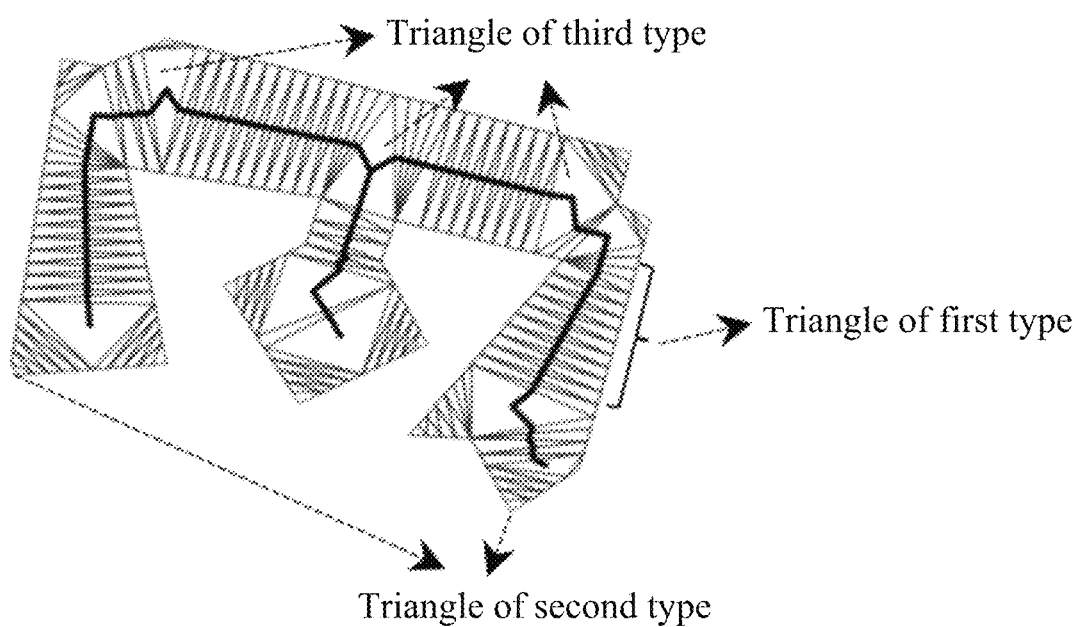
FIG. 4 shows a method for extracting skeleton lines provided by the present disclosure.

Dividing Delaunay triangles into three types: as shown in FIG. 4, a triangle with one edge on the boundary of the building is called a triangle of a first type, a triangle with two edges on the boundary of the building is called a triangle of a second type, and a triangle without edges on the boundary of the building is called a triangle of a third type.

Step 2: Performing connection to form local skeleton lines. For the triangle of a first type, connecting midpoints of two edges not located on the least-squares template to form local skeleton lines; and for the triangle of a third type, connecting a center of the triangle and midpoints of three edges to generate local skeleton lines.

Step 3: Connecting the local skeleton lines to form skeleton lines: A connecting principle is as follows: by taking the midpoints of all the triangles of a third type as starting points, connecting the midpoints sequentially to the partial skeleton lines of the triangles of a first type between the midpoints of the next adjacent triangles of a third type, thereby forming complete skeleton lines.

Figure 5:
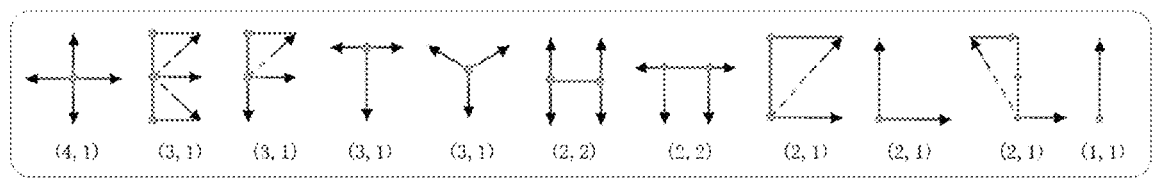
FIG. 5 shows feature vectors of a template library provided by the present disclosure.

The following are the feature vector calculation steps:

Step 1: Breaking the skeleton lines of templates at intersection points, and connecting endpoints of the skeleton lines to form the feature vectors by taking the points with the largest number of connected line segments as starting points. By taking FIG. 5 as an example, the feature vector set of the first template is represented as (4,1), where the number "4" represents the number of feature vectors connected by an intersection point, and "1" represents the number of intersection points with this feature. The feature vector set of the sixth template is (2,2), indicating that two feature vectors intersect at one point, and there are two intersection points with this feature.

Figure 6A:
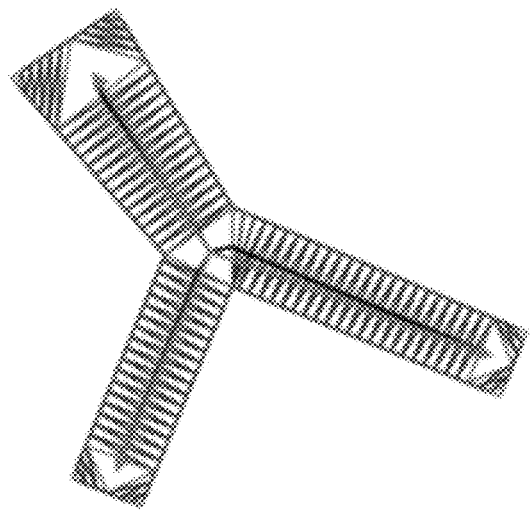
FIG. 6A shows a method for extracting feature vectors of a Y-type building provided by the present disclosure.
Figure 6B:
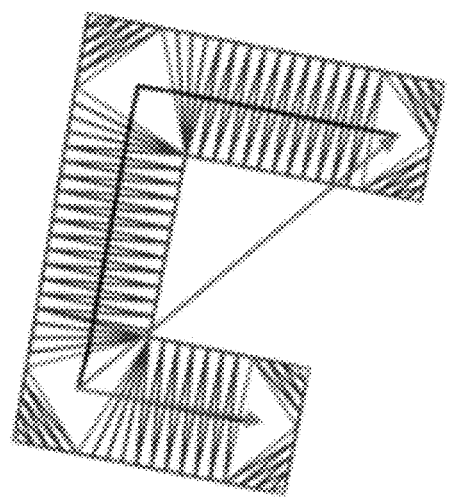
FIG. 6B shows a method for extracting feature vectors of a C-type building provided by the present disclosure.

Step 2: After extracting the skeleton lines of the building polygon, extracting the feature vectors according to a certain rule. If there is a point on the skeleton line that is the intersection point of three line segments, connecting the intersection point to the midpoint of the last adjacent triangle of the third type to form a set of vectors, as shown by the ray in FIG. 6A. Otherwise, connecting the intersection point with the largest number of connected line segments with an inner center of the last triangle of the third type, as shown in FIG. 6B.

The following are template matching steps:

Step 1: Employing the feature vector sets to preliminarily screen the templates in the template library, and reserving templates identical to the feature vector sets of the buildings for further calculation.

Figure 7:
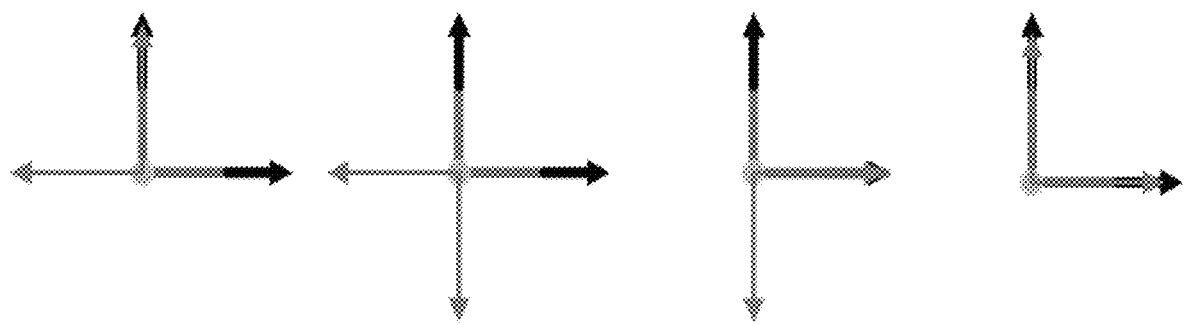
FIG. 7 shows a feature vector superposition method provided by the present disclosure.

Step 2: Moving all the starting points of the feature vectors to an origin (0, 0), where this operation is capable of placing the feature vectors of the map buildings on the same basis as the feature vectors of the templates in the template library. Performing further superposition on the feature vectors of the buildings and the feature vectors of the templates so as to ensure that the calculated cosine similarity is the largest. The effect of performing rotation superposition by taking 90 degrees as a fixed angle is shown in FIG. 7.

Figure 8:
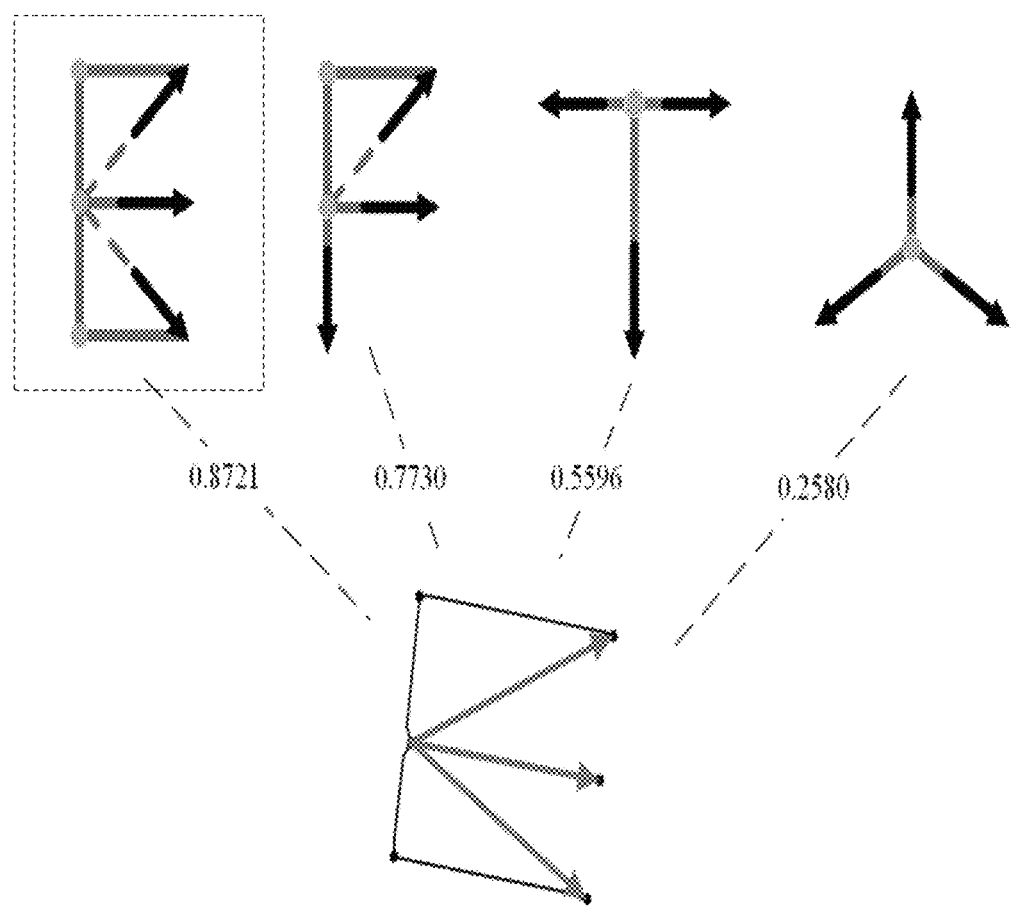
FIG. 8 shows a largest cosine similarity matching method provided by the present disclosure.

Step 3: Calculating cosine similarity (Formula 1) between the feature vectors of the buildings and the feature vectors of the templates after each rotation, and taking a maximum value of the cosine similarity obtained as the cosine similarity between the feature vectors of the buildings and the feature vectors of the templates after one revolution, as shown in FIG. 8.

$$\cos\theta = \frac{\sum_{i=1}^{n} \cos\theta i < vi \in vg1, vi \in vg2 >}{n} \quad \text{(Formula 1)}$$

Finally, 187 building targets with typical shape features in a certain area of Lanzhou City are selected as experimental objects to perform pattern recognition and classification by using the method of the present patent, and results are shown in FIG. 9 and FIG. 10. Relatively good classification results are obtained The above descriptions of the examples disclosed enable professionals skilled in the art to implement or use the present disclosure. Various modifications to these examples are readily apparent to professionals skilled in the art, and the general principles defined herein may be implemented in other examples without departing from the spirit or scope of the present disclosure. Therefore, the present disclosure is not limited to these examples shown in the solution but falls within the widest scope consistent with the principles and novel features disclosed in the present disclosure.

What is claimed is:

1. A classification method for map building shapes, comprising two parts, namely extracting skeleton lines of buildings, and constructing a template library and performing template matching by calculating cosine similarity of feature vectors:

the steps for extracting skeleton lines are as follows:
S1: extracting building feature points by using a Douglas-Peucker algorithm;
S2: fitting points between feature points in a building polygon by using a least square method to obtain a line segment, and then extending each fitted line segment to form a closed polygon which is a least-squares template of the map building;
S3: encrypting a point set constituting a boundary of the least-squares template of the building, and performing constrained Delaunay triangulation on this basis: dividing Delaunay triangles into three types: a triangle with one edge on the boundary of the building being called a triangle of a first type, a triangle with two edges on the boundary of the building being called a triangle of a second type, and a triangle without edges on the boundary of the building being called a third type of triangle;
S4: performing connection to form local skeleton lines: for the triangle of a first type, connecting midpoints of two edges not located on the least-squares template to form local skeleton lines; and for the triangle of a third type, connecting a center of the triangle and midpoints of three edges to generate local skeleton lines;
S5: connecting the local skeleton lines to form skeleton lines, a connecting principle being: by taking the midpoints of all the triangles of a third type as starting points, connecting the midpoints sequentially to the partial skeleton lines of the triangles of a first type between the midpoints of the next adjacent triangles of a third type, thereby forming complete skeleton lines;

the steps of calculating feature vectors and performing template matching by using cosine similarity are as follows:
S6: generating feature vectors of the buildings and templates: breaking the skeleton lines at intersection points, and connecting endpoints of the skeleton lines to form the feature vectors by taking the points with the largest number of connected line segments as starting points;
S7: performing preliminary screening on the templates: since feature vector sets corresponding to different shapes are different, firstly, employing the feature vector sets to preliminarily screen the templates in the template library, and reserving templates identical to the feature vector sets of the buildings for further calculation;
S8: performing superposition on the feature vectors: moving all the starting points of the feature vectors to an origin (0, 0), wherein this operation is capable of placing the feature vectors of the map buildings on the same basis as the feature vectors of the templates in the template library; fixing the feature vectors of the templates, and rotating the feature vectors of the buildings by a revolution by taking a fixed angle as a step size;
S9: calculating cosine similarity between the feature vectors of the buildings and the feature vectors of the templates after each rotation, and taking a maximum value of the cosine similarity obtained as cosine similarity between the feature vectors of the buildings and the feature vectors of the templates after one revolution; and
S10: determining the highest similarity, namely the category to which the buildings belong, by calculating the cosine similarity between the buildings and the screened templates.

2. The method for extracting skeleton lines according to claim 1, wherein in S1 to S5, firstly, the Douglas-Peucker algorithm is employed to extract building feature points and construct a least-squares template, and the skeleton lines of buildings are extracted on this basis.

3. The building shape matching method according to claim 1, wherein in S6-S10, firstly, feature vectors of skeleton lines of the buildings and skeleton lines of the templates are calculated respectively, and on this basis, the most matching template is found by means of the cosine similarity as a classification basis.

* * * * *